United States Patent
Kulkarni et al.

(10) Patent No.: US 11,698,869 B1
(45) Date of Patent: Jul. 11, 2023

(54) COMPUTING AN AUTHENTICATION TAG FOR PARTIAL TRANSFERS SCHEDULED ACROSS MULTIPLE DIRECT MEMORY ACCESS (DMA) ENGINES

(71) Applicant: NVIDIA Corporation, Santa Clara, CA (US)

(72) Inventors: Vaishali Kulkarni, Sunnyvale, CA (US); Naveen Cherukuri, San Jose, CA (US); Raymond Wong, Palo Alto, CA (US); Adam Hendrickson, Morgan Hill, CA (US); Gobikrishna Dhanuskodi, Santa Clara, CA (US); Wish Gandhi, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/654,359

(22) Filed: Mar. 10, 2022

(51) Int. Cl.
| | |
|---|---|
| *G06F 12/14* | (2006.01) |
| *G06F 13/16* | (2006.01) |
| *G06F 13/28* | (2006.01) |
| *G06N 3/04* | (2023.01) |
| *H04L 9/06* | (2006.01) |

(52) U.S. Cl.
CPC ...... *G06F 12/1408* (2013.01); *G06F 12/1441* (2013.01); *G06F 12/1458* (2013.01); *G06F 13/1673* (2013.01); *G06F 13/28* (2013.01); *G06N 3/04* (2013.01); *H04L 9/0637* (2013.01); *H04L 9/0643* (2013.01)

(58) Field of Classification Search
CPC ............. G06F 12/1408; G06F 12/1441; G06F 12/1458; G06F 13/1673; G06F 13/28

USPC .......................................................... 711/163
See application file for complete search history.

(56) References Cited

U.S. PATENT DOCUMENTS

| | | | | |
|---|---|---|---|---|
| 2002/0057800 | A1* | 5/2002 | Gordon ............... | G07F 17/3241 380/251 |
| 2015/0003250 | A1* | 1/2015 | Bouley .................. | H04L 47/39 370/236 |

(Continued)

OTHER PUBLICATIONS

McGrew D, Viega J. The Galois/counter mode of operation (GCM). submission to NIST Modes of Operation Process. Jan. 15, 2004;20:0278-070.

(Continued)

*Primary Examiner* — Edward J Dudek, Jr.
*Assistant Examiner* — Sidney Li
(74) *Attorney, Agent, or Firm* — Lowenstein Sandler LLP

(57) ABSTRACT

The subject application relates to computing an authentication tag for partial transfers scheduled across multiple direct memory access (DMA) engines. Apparatuses, systems, and techniques are described for computing an authentication tag for a data transfer when the data transfer is scheduled as partial transfers across a specified number of direct memory access (DMA) engines. An orchestration circuit stores partial authentication tags, computed by the DMA engines, and corresponding adjustment exponents during one or more rounds in which the partial transfers are scheduled and processed by the specified number of DMA engines. During a last round, a combined authentication tag can be computed based on the partial authentication tags and the corresponding adjustment exponents stored by the orchestration circuit during the rounds.

20 Claims, 10 Drawing Sheets

(56) References Cited

U.S. PATENT DOCUMENTS

2015/0324248 A1* 11/2015 Tomozaki ........... G06F 11/1076
                                                714/807
2019/0132118 A1*  5/2019 Ghosh .................. H04L 9/0838
2021/0103402 A1*  4/2021 Kuroki ................. G06F 3/0655
2022/0311756 A1*  9/2022 Yankilevich ......... H04L 9/0637

OTHER PUBLICATIONS

Dworkin, Morris J. "Recommendation for block cipher modes of operation: Galois/Counter Mode (GCM) and GMAC." (2007).
Buhrow, B., Fritz, K., Gilbert, B. and Daniel, E., 2015, December. A highly parallel AES-GCM core for authenticated encryption of 400 GB/s network protocols. In 2015 International Conference on ReConFigurable Computing and FPGAs (ReConFig) (pp. 1-7). IEEE.

* cited by examiner

COMPUTING AN AUTHENTICATION TAG FOR PARTIAL TRANSFERS SCHEDULED ACROSS MULTIPLE DIRECT MEMORY ACCESS (DMA) ENGINES

TECHNICAL FIELD

At least one embodiment pertains to processing resources used to perform and facilitate confidential data transfers. For example, at least one embodiment pertains to hardware circuits for computing an authentication tag for partial transfers scheduled across direct memory access (DMA) engines.

BACKGROUND

Accelerator circuits include direct memory access (DMA) circuits to access system memory independently of a central processing unit (CPU). The DMA circuits can also be used for memory-to-memory copying or moving of data within memory or between memories. When data needs to be protected, the DMA circuits can implement cryptographic circuits to encrypt and decrypt data being copied from and to secure memory. Multiple DMA engines can be used in high-speed interconnects (e.g., 2.4 TB/s bandwidth, 300 GB/s bidirectional bandwidth) to achieve very high data transfer rates. Large transfers can be split into multiple data segments and scheduled to multiple DMA engines to saturate the memory or link bandwidths. However, when confidentiality of the data is required for transfers, authentication tag generation remains a challenge at such high speeds across the multiple DMA engines. In particular, the authentication tag generation is inherently a sequential multiply-add operation, and the multiple DMA engines can be physically distant from one another. Some implementations authenticate each split independently by creating an authentication tag and using separate initialization vectors (IVs) for each block (split) in the encrypted data stream. This, however, increases the memory footprint to utilize the cryptographic hardware and requires extra effort on a software driver stack to manage and authenticate each split. Other implementations use one or more additional cryptographic hardware engines for the authentication computations, but this has an extra area cost.

DETAILED DESCRIPTION

Figure 1:
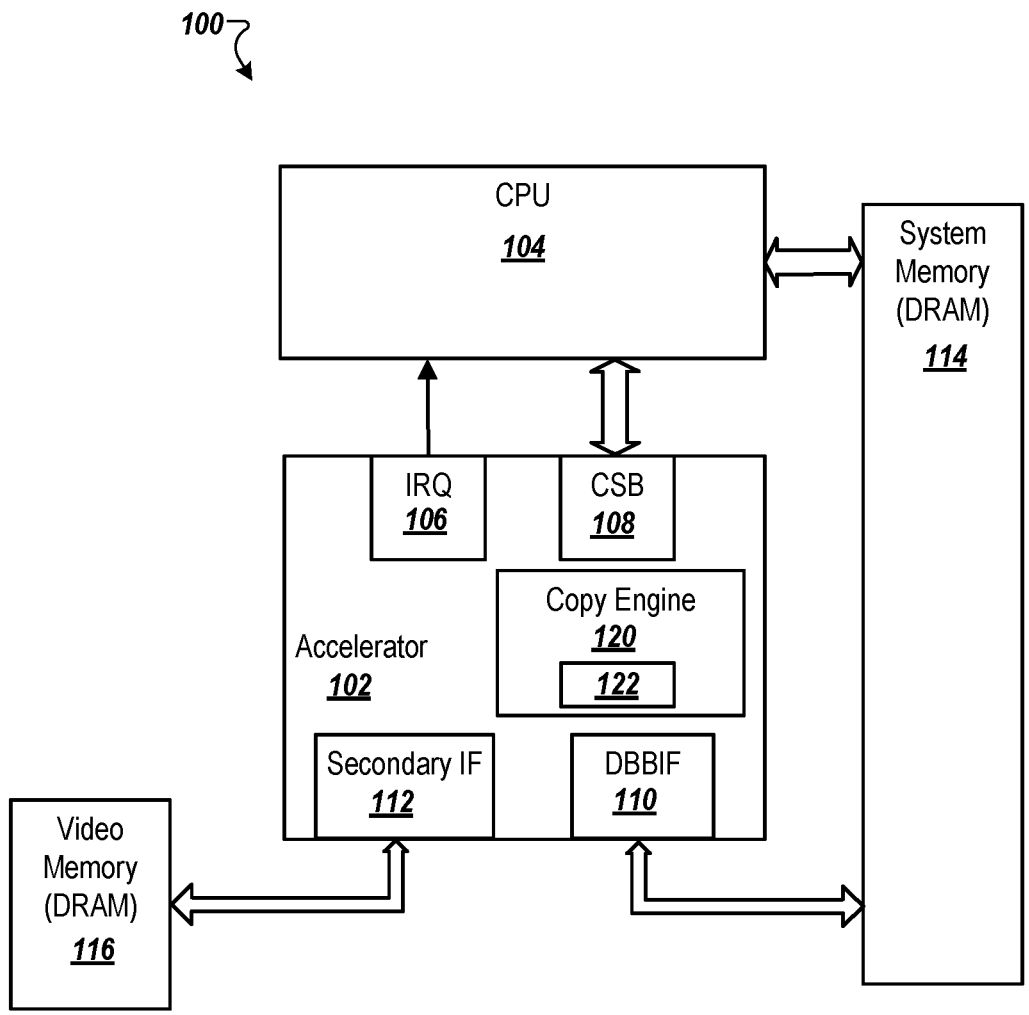
FIG. 1 is a block diagram of a computing system with an accelerator circuit including a copy engine that computes an authentication tag for partial transfers scheduled across multiple DMA engines, in accordance with at least some embodiments.

As described above, DMA circuits can be used for memory-to-memory copying or moving of data within memory and can include cryptographic hardware to protect data. The sequential cryptographic algorithms that use sequential operations introduce some challenges when using multiple DMA engines to increase bandwidth. In particular, Advanced Encryption Standard Galois Counter Mode (AES-GCM) is an authenticated encryption algorithm that performs both encryption and authentication of data streams. DMA engines that support AES-GCM can provide secure data transfers for applications where confidentiality is required. AES-GCM is a high-speed authenticated encryption mode that generates cipher text and an authentication tag simultaneously by using a counter (CTR) mode and a hash function defined over a binary finite field (e.g., the Galois Field (GF) ($2^{128}$)), respectively. The hash function, which sequentially analyzes the data to compute a message authentication code (called GHASH), provides assurance of the authenticity of the confidential data using a universal hash function defined over a binary finite field (e.g., GF). A finite field is defined by its multiplication and addition operations. These operations obey the basic algebraic properties such as commutativity, associativity, and distributivity. Both operations map a pair of field elements onto another field element. On a polynomial basis, the multiplication of two elements consists of multiplying the polynomial representing the two elements, then dividing the resulting 256-bit polynomial by the field polynomial; the 128-bit remainder is the result.

While it is possible to generate cipher text using parallel AES-GCM hardware engines, the authentication tag generation remains a challenge, given that the AES-GCM algorithm includes sequential multiply-add operations. It is even more challenging at high speeds across physically distant DMA engines. As described above, some implementations authenticate each split independently by creating an authentication tag and using separate IVs for each partial transfer (split) in the encrypted data stream. This, however, can increase the memory footprint to utilize the cryptographic hardware and requires extra effort on a software driver stack to manage and authenticate each split. Other implementations use one or more additional cryptographic hardware engines for the authentication computations, but this usually has an extra area cost.

Another approach uses parallel GHASH computations by interleaving the data bytes across parallel AES cores that are physically placed in close proximity such that the authentication tag can be calculated using multiplexing structures. However, this approach is typically limited to parallel AES cores that are in close proximity to one another and may not work for applications that require software configuration to select the number of parallel DMA engines needed to meet a bandwidth need for a given system.

Aspects and embodiments of the present disclosure address these and other challenges by providing a two-pronged hardware solution in which a first hardware entity orchestrates encryption and authentication tag computations across multiple DMA engines and a second hardware entity that manages interleaving data across parallel AES cores inside a single DMA engine. As a result, aspects of the present disclosure can support a configurable number of DMA engines to be grouped for variable data transfer sizes (e.g., 1 byte (B) to 4 gigabytes (GB)). For example, the data transfer can be split into a set of partial transfers (or data transfer portions) (e.g., 8 KB) of equal-sized chunks by a scheduler circuit with a last chunk which can have any size smaller than the other chunks. In at least one embodiment, the DMA engine includes a logical DMA engine and multiple physical DMA engines, with at least some of the multiple physical DMA engines having cryptographic hardware. The logical DMA engine can simply the software's view and offload the data transfer scheduling to multiple physical DMA engines. Large transfers can be split into partial transfers (e.g., 8 KB) by a scheduler circuit, and the logical DMA engine can schedule the partial transfers to all available physical DMA engines to saturate the bandwidth of a memory or a link. The logical DMA engine can load balance the partial transfers across the available DMA engines and use a round-robin arbitration. In other embodiments, other scheduling algorithms can be used.

An encryption key and IV can be assigned to a context. Before the physical DMA engines perform the cryptographic operations, the logical DMA engines can exchange the encryption keys and IV with the multiple physical DMA engines during a context bind process. In some embodiment, the context bind latency is used to pre-compute multiplier exponents, which are a function of a split size and a number of physical DMA engines being configured. A GF multiplier can be used for low latency binary exponentiation methods to pre-compute the multiplier exponents. The split size and the number of physical DMA engines are known at the time of context bind, allowing the multiplier exponents to be pre-computed and securely stored for the cryptographic operations. This allows the GHASH to be calculated without pausing the data cycles during a data transfer. The time during context switching can be used to generate key rounds and the GHASH multipliers, which is a function of the key. Each engine can calculate several multiplier exponents based on the split size and the number of DMA engines during the context bind latency. The multiplier exponents can be saved in secure storage to avoid data leaks. Each engine receives an IV which is incremented for each copy split. This ensures that the correct counter value is used for AES-GCM for encrypting the plain text or decrypting cipher text. Each engine can generate encrypted data for the respective split, and each engine can calculate a partial authentication tag for the length of the split independently. At the end of a round which is defined as all mapped physical DMA engines completing one split transfer, a multiplier exponent is determined for each DMA engine. This multiplier exponent can be used to multiply the partial authentication tag to adjust for the data bytes worked on by the other physical DMA engines. While the exponents are multiplied with partial authentication tag from each engine, the engine can continue with the next split. The rounds can continue until a lost copy split is issued. At the end of the data transfer, the partial authentication tags from all engines can be combined, and the length of the entire message can be included in the combined authentication tag. The tag can be encrypted using the pre-incremented IV to generate one final coherent authentication tag. It is possible for the DMA engine to be preempted and, in this case, the authentication tag after adjustments can be saved into secure storage (e.g., secure SRAM).

When the transfer is scheduled again at a later time, the authentication tag can be restored from the secure storage, and the GHASH calculation can resume. In this manner, an accelerator circuit can use multiple DMA engines and compute an authentication tag for partial transfers scheduled across multiple DMA engines. The accelerator circuit can be a graphics processing unit (GPU), a deep learning accelerator (DLA) circuit, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), or a field-programmable gate array (FPGA). Accelerator circuits can address the computational demands of the neural network inference stage by providing building blocks that accelerate core deep learning operations. A deep learning accelerator, for example, can be used to accelerate different neural networks, such as convolutional neural networks (CNNs), recurrent neural networks (RNN), fully connected neural networks, and so on.

An accelerator circuit can be scheduled by a host central processing unit (CPU) coupled to the accelerator circuit. Alternatively, the accelerator circuit can be scheduled locally by firmware to ensure minimum latency. The accelerator circuit can be used for different types of layers in these neural networks, such as fixed-function engines for convolutions, activation functions, pooling, batch normalization, or the like. It should be noted that a neural network from an algorithmic perspective can be specified with one set of layers (referred to herein as "original layers") such as bias and batch normalization. Those original layers can be compiled or transformed into another set of layers (referred to herein as "hardware layers") where each hardware layer is used as a basic element for scheduling to be executed on an accelerator circuit. The mapping between original layers and hardware layers can be m:n, where m is the number of original layers and n is the number of hardware layers. For example, in a neural network, original layers bias, batch normalization, and local response normalization (LRN), such as a rectified linear unit (ReLU), can be compiled into one hardware layer. In that case, the m:n is 3:1. Each hardware layer can be represented by a basic hardware instruction for the accelerator circuit to perform an operation, and each layer can communicate with another layer by a memory interface. For example, a first layer can be performed by a first-fixed function engine in a DLA circuit that receives an input tensor, performs an operation on the input tensor to generate an output tensor, and stores the output tensor in system memory, such as dynamic random access memory (DRAM) coupled to the accelerator. A second fixed-function engine can perform a second layer that receives the output tensor from the first layer from memory as a second input tensor, performs an operation on the second input tensor to generate a second output tensor, and stores the second output tensor in DRAM. Each communication introduces a tensor read operation, and a tensor write operation in the memory interface.

Accordingly, aspects of the present disclosure permit the use of multiple cryptographic hardware engines while computing an authentication tag for partial transfers scheduled across multiple DMA engines despite different transfer sizes. Aspects of the present disclosure do not require transfers to be split by software and encrypted separately ahead of time, which would produce multiple authentication tags for each of the splits. The aspects of the present disclosure can generate one coherent authentication tag across physically distant DMA engines and allow the software to program any number of DMA engines required for the system or application. The aspects of the present disclosure do not require additional AES cores for combining GHASH across multiple engines.

FIG. 1 is a block diagram of a computing system 100 with an accelerator circuit 102 including a copy engine 120 that computes an authentication tag for partial transfers scheduled across multiple DMA engines, in accordance with at least some embodiments. The computing system 100 is considered a headless system in which unit-by-unit management of an accelerator circuit 102 happens on a main system processor, CPU 104. The accelerator circuit 102 includes an interrupt interface 106, a configuration space bus (CSB) interface 108, a primary data bus interface 110 (data backbone interface (DBBIF)), a secondary data bus interface 112, and a copy engine (CE) 120, as described in more detail below. The CPU 104 and the accelerator circuit 102 are coupled to system memory 114 (e.g., DRAM). The accelerator circuit 102 is coupled to the system memory 114 via the primary data bus interface 110. The accelerator circuit 102 can be coupled to a secondary memory 116, such as video memory (DRAM and/or SRAM), via the secondary data bus interface 112. The CSB interface 108 can be a control channel interface that implements a register file (e.g., configuration registers) and an interrupt interface. In at least one embodiment, the CSB interface 108 is a synchronous, low-bandwidth, low-power, 32-bit control bus designed to be used by the CPU 104 to access configuration registers in the accelerator circuit 102. The interrupt interface can be a 1-bit level-driven interrupt. The interrupt line can be asserted when a task has been completed or when an error occurs.

The accelerator circuit 102 can also include a memory interface block that uses one or more bus interfaces to interface with memory. In at least one embodiment, the memory interface block uses the primary data bus interface 110 connecting to the system memory 114. The system memory 114 can include DRAM. The primary data bus interface 110 can be shared with the CPU and input/output (I/O) peripherals. In at least one embodiment, the primary data bus interface 110 is a data backbone (DBB) interface that connects the accelerator circuit 102 and other memory subsystems. The DBB interface is a configurable data bus that can specify different address sizes, different data sizes, and issue different sizes of requests. In at least one embodiment, the DBB interface uses an interface protocol, such as AXI (Advanced Extensible Interface) or other similar protocols. In at least one embodiment, the memory interface block uses the secondary data bus interface 112 to connect to secondary memory 116 dedicated to the accelerator circuit 102. The secondary memory 116 can include DRAM. The secondary memory 116 can be video memory. The accelerator circuit 102 can also include a memory interface that connects to higher-bandwidth memory dedicated to the accelerator circuit 102. This memory can be on-chip SRAM to provide higher throughput and lower access latency.

For example, during inference, a typical flow begins with a management processor (either a microcontroller or a CPU), coupled to accelerator circuit 102, sending a hardware layer configuration and an activate command. If data dependencies do not preclude this, multiple hardware layers can be sent to different engines and activated simultaneously (e.g., if there is another layer whose inputs do not depend on the previous layer's output). In at least one embodiment, every engine can have a double buffer for its configuration registers that allows a second layer's configuration to begin processing when the active layer has completed. Once a hardware engine finishes its active task, the accelerator circuit 102 can interrupt the management processor to report the completion, and the management processor can begin the process again. This kind of command-execute-interrupt flow repeats until inference on the entire network is complete. In at least one embodiment, an interrupt interface can signal completion of a copy. In another embodiment, a semaphore release (write to a flag typically in system memory that CPU thread is polling) can be used to let software know that the workload has finished.

The computing system 100 of FIG. 1 represents a more cost-sensitive system than a computing system with a dedicated controller or coprocessor for unit-by-unit management of the accelerator circuit 102. The computing system 100 can be considered a small system model. The small system model can be used for cost-sensitive connected Internet of Things (IoT) class devices, artificial intelligence (AI), and automation-oriented systems with well-defined tasks for which cost, area, and power are the primary drivers. Savings in terms of cost, area, and power can be achieved through configurable resources of the accelerator circuit 102. Neural network models can be pre-compiled, and their performance can be optimized, allowing larger models to be reduced in load complexity. In turn, the reduction in load complexity enables a scaled-down DLA implementation where models consume less storage and take less time for system software to load and process. In at least one embodiment, the computing system 100 can execute one task at a time. Alternatively, the computing system 100 can execute multiple tasks at a time. For computing system 100, context switches by computing system 100 do not result in the CPU 104 being overly burdened by servicing a large number of interrupts from the accelerator circuit 102. This removes the need for an additional microcontroller, and the CPU 104 performs memory allocation and other subsystem management operations. As described herein, the accelerator circuit 102 includes a copy engine 120 that computes an authentication tag for partial transfers scheduled across multiple DMA engines. The copy engine 120 includes an orchestration circuit 122 that can manage the encryption and authentication tag computation across multiple DMA engines. In at least one embodiment, the orchestration circuit 122 can store partial authentication tags for each partial transfer and adjustment exponents for each partial transfer. The orchestration circuit 122 can calculate an authentication tag for a data transfer based on the partial authentication tags and the corresponding adjustment exponents. Additional details of the copy engine 120 are described below with respect to FIGS. 2-4.

Figure 2:
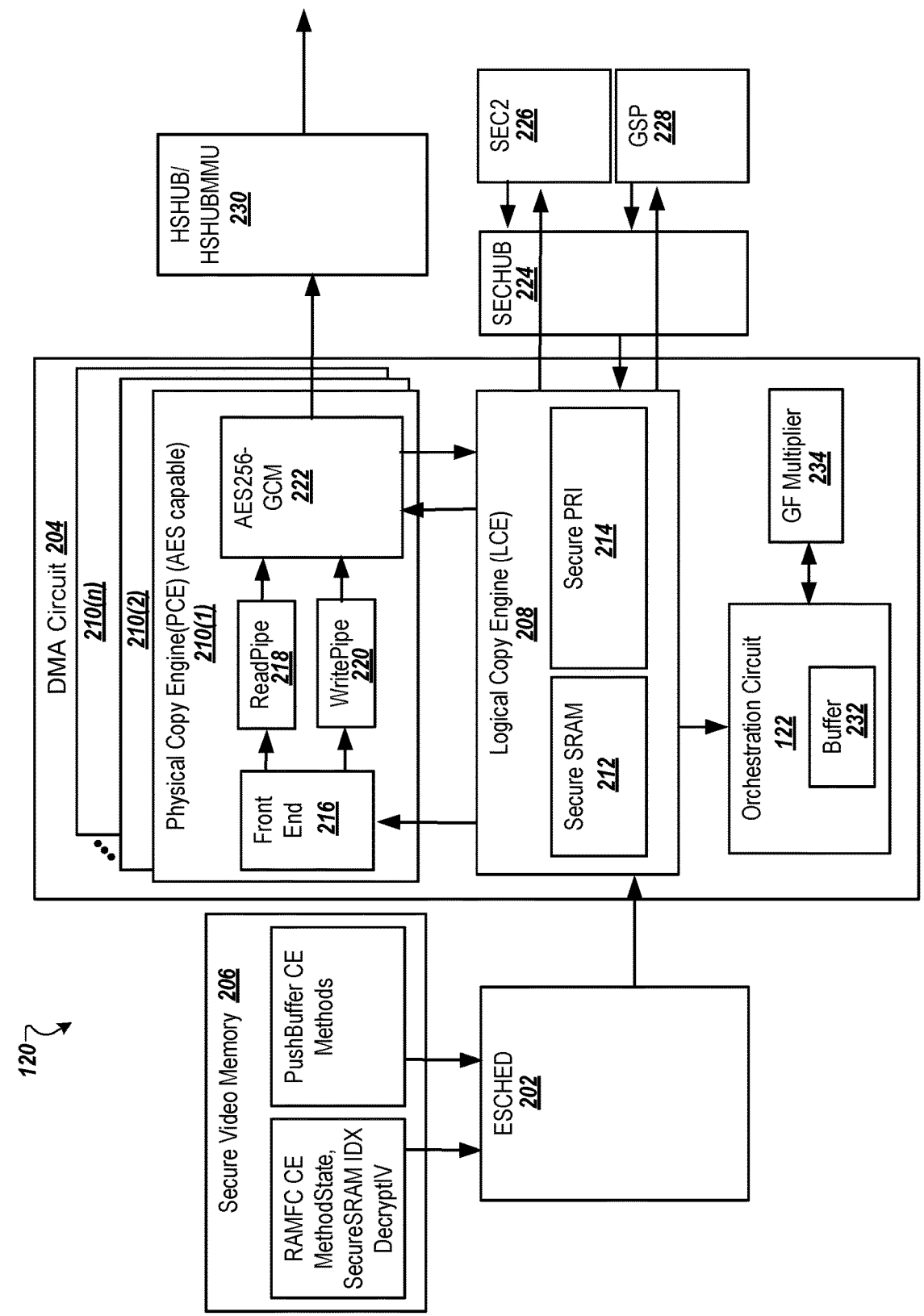
FIG. 2 is a block diagram of a copy engine of an accelerator circuit with an orchestration circuit for computing an authentication tag for partial transfers scheduled across multiple DMA engines, in accordance with at least some embodiments.

FIG. 2 is a block diagram of a copy engine 120 of an accelerator circuit with an orchestration circuit 122 for computing an authentication tag for partial transfers scheduled across multiple DMA engines, in accordance with at least some embodiments. The copy engine 120 includes a hardware scheduler circuit 202 (labeled ESCHED for engine scheduler) and a direct memory access (DMA) circuit 204. The hardware scheduler circuit 202 is coupled to secondary memory 206 and the DMA circuit 204. The DMA circuit 204 is coupled to a memory management unit 230 (MMU), which is coupled to system memory (not illustrated in FIG. 2). The MMU 230 can provide routing functionality between system memory and the accelerator circuit. The MMU 230 can provide a path for all engines on the accelerator, including the copy engine 120, to access any location in memory (e.g., video memory, system memory, etc.). The MMU 230 can perform access checks to allow only permitted accesses across the interface. The MMU 230 can restrict and report illegal accesses. The DMA circuit 204 includes a cryptographic circuit that implements an authenticated encryption algorithm to encrypt retrieved data from the secure memory or decrypt received data to be stored in secure memory. In at least one embodiment, as illustrated in FIG. 2, the DMA circuit 204 includes a logical copy engine (LCE) 208 and multiple physical copy engines (PCEs) 210 coupled to the LCE 208. In other embodiments, the DMA circuit 204 includes multiple LCEs and multiple PCEs. The LCE 208 can include a secure memory 212 that can store an encrypt IV, a block counter, and a HASH key per each channel key slot. Each channel key slot, which can be assigned to an application, can store context for the application in a specified slot in the secure memory 212. The LCE 208 can also include secure private interface 214 that receives configuration information, encrypt and decrypt keys, IV random number generator, secure SRAM programming, from a security hub or other security circuitry that manages private keys. In at least one embodiment, the encrypt and decrypt keys and IV are produced by a random number generator from a security processor on the GPU.

In at least one embodiment, as illustrated in FIG. 2, the PCE 210 includes front-end circuitry 216, a read pipeline 218, a write pipeline 220, and a cryptographic circuit 222 that provides secure data transfers for applications where confidentiality is required. In at least one embodiment, the cryptographic circuit 222 is an AES-GCM hardware engine that implements the AES256-GCM cipher. In at least one embodiment, the cryptographic circuit 222 is an AES-GCM circuit. Alternatively, the cryptographic circuit 222 can implement other sequential cryptographic algorithms in which the underlying cryptographic hardware is shared among multiple users (e.g., multiple applications in a time-sliced manner). For example, the cryptographic hardware can be shared by multiple users in a cloud infrastructure. For another example, the cryptographic hardware can be used in a virtualized environment in which a hypervisor allows the underlying hardware to support multiple guest virtual machines (VMs) by virtually sharing its resources, including the accelerator circuit 120. In another embodiment, the DMA circuit 204 includes an LCE 208 and a first PCE 210, and a second PCE. The first PCE 210 is coupled to the LCE 208 and includes the cryptographic circuit 222, the first read pipeline 218, and the write pipeline 220. The second PCE is coupled to the LCE 208 and includes a second cryptographic circuit, a second read pipeline, a second write pipeline, and second front-end circuitry. In at least one embodiment, the second cryptographic circuit is a second AES-GCM circuit. Additional PCEs can each include front-end circuitry, a read pipeline, a write pipeline, and a cryptographic circuit.

In at least one embodiment, the copy engine 120 can encrypt data in connection with a data transfer. To encrypt the data transfer, a context is loaded (CTXT LOAD) on LCE 208 with a valid SRAM index that points to a slot in the secure memory 212 assigned to an application. The KEY indicated in the slot in the secure memory 212 is loaded on the cryptographic circuit 222 (AES hardware engine). During encryption operation, first PCE 210 reads from protected memory (e.g., video memory), encrypts the data internally using the cryptographic circuit 222 and writes encrypted data into unprotected region (e.g., system memory or video memory). In at least one embodiment, the copy engine 120 can decrypt data in connection with a data transfer. To decrypt the data transfer, a context is loaded (CTX LOAD) on LCE 208 with a valid SRAM index that points to a slot in the secure memory 212 assigned to an application. The KEY indicated in the slot in the secure memory 212 is loaded on the cryptographic circuit 222 (AES hardware engine). During decryption operation, first PCE 210 reads from unprotected memory (e.g., in system memory or video memory), decrypts the data internally using the cryptographic circuit 222 and writes decrypted data into protected region (e.g., video memory).

In at least one embodiment, the W is 96 bits and contrasted from two components, including a 64-bit channel counter with a unique identifier per channel and a 32-bit message counter that starts from zero and is incremented per encrypt/decrypt start of channel (SOC). A 96-bit RNG mask is a per-key mask that is stored in Secure PRI. A copy IV (COPY_IV) is a RNG XOR [CHANNEL_CTR, ++MSG_CTR]. The copy engine can detect that an IV has exceeded the maximum number of copies by detecting if the MESSAG_CTR+1 value used in the COPY_IV construction is zero. The copy engine 120 keeps track of the encrypt IV used in each encrypt copy and performs pre-increment and save-restore from the SRAM. Encrypt IV is passed to the cryptographic circuit 222 post XOR with RNG in the decryptIV methods per copy. The IV that is saved in the SRAM is reflected based on copy completion. The copy engine 120 can have multiple encrypted copies visible to the PCE and maintains two counters, including the IV that should be sent on the net encrypt copy and the last copy completed. On a context save (CTXT_SAVE) the IV from the last completed copy is saved to SRAM. The IV for decryption is stored in the instance block and passed to the copy engine 120 during a decrypt copy via decrypt IV methods. The copy engine 120 can detect overflow and interrupt if MESSAGE_CTR=0. The copy engine 120 can XOR the decrypt IV with the correct RNG before passing from LCE to the front-end circuitry 216.

In at least one embodiment, the copy engine 120 includes a secure private interface 214. The secure private interface 214 is accessible by secure software to provide secure configuration or secret keys and query interrupt status for encryption and decryption. The copy engine 120 can connect to a secure hub 224 as a client, allowing a dedicated on-chip security processor (SEC2) 226 and a GPU System Processor (GSP) 228 to access the secure private interface 214, but does not allow BAR0 access. The GSP 228 can be used to offload GPU initialization and management tasks. The SEC2 226 manages encryption keys and other secure information used by the accelerator circuit 100.

In at least one embodiment, the secure memory 212 is a secure SRAM with N entries (e.g., 512 entries), each with a valid bit. Each entry has a lower and upper 128-bit component. The lower component can contain a first encrypt IV counter, a second encrypt IV counter, an IV channel identifier, one or more key indexes, preemption information, and a block counter. The higher component can contain a first partial authentication tag, a second partial authentication tag, a third partial authentication tag, and a fourth partial authentication tag. The secure SRAM can be programmed through the secure private interface 214 via registers. The SRAM can support read, write, and invalidate functionality. The SRAM index can be marked valid when the lower 128 bits of the 256-bit entry are programmed by SEC2 226/GSP 228. An attempt to read an invalid SRAM entry can return 0×0 in the data registers. On a fatal error, the state of the SRAM cannot be guaranteed to be valid. The copy engine 120 can automatically invalidate the SRAM index on a fatal error, so software reprograms the SRAM index.

During operation in at least one embodiment, the hardware scheduler circuit 202 receives a first descriptor of a first data transfer of a first size associated with a first application. The first size can represent a complete copy size of the first data transfer. The first descriptor specifies a first index in the secure memory 212 corresponding to the first application. The hardware scheduler circuit 202 splits the first data transfer into a first set of portions. Each portion should be less than or equal to the first size and is required to complete execution before a context switch to another application. For example, the portions can be 8 KB each. Alternatively, other sizes can be used. The portions can be chunks, partial transfers, or partial copies that collectively make up the complete copy of the first data transfer. Once the hardware schedule circuit 202 has scheduled a set of partial transfers, the LCE 208 schedules a first partial transfer to a first PCE 210(1) and stores a first adjustment exponent in a buffer 232, in the orchestration circuit 122, the buffer 232 being associated with the first PCE 210(1). The first PCE 210(1) generates encrypted data for the first partial transfer, calculates a first partial authentication tag for a length of the first partial transfer, and stores the first partial authentication tag in the buffer 232. The LCE 208 schedules a second partial transfer to a second PCE 210(2) and stores a second adjustment exponent in the buffer 232. The second PCE 210(2) generates encrypted data for the second partial transfer, calculates a second partial authentication tag for a length of the second partial transfer, and stores the second partial authentication tag in the buffer 232. The first partial authentication tag and the first adjustment exponent can be stored in a first first-in, first-out (FIFO) buffer associated with the first PCE 210 and the second partial authentication tag and the second adjustment exponent can be stored in a second FIFO buffer associated with the second PCE 210. There can be an M number of PCEs, and the LCE 208 can schedule M number of partial transfers similarly as described above.

In at least one embodiment, the orchestration circuit 122 calculates a first authentication tag for the first data transfer based on at least the first adjustment exponent, the first partial authentication tag, the second adjustment exponent, and the second partial authentication tag. If there is an M number of PCEs, the orchestration circuit 122 calculates the first authentication tag for the first data transfer based on the M number of adjustment exponents and M number of partial authentication tags.

In at least one embodiment, the equations below show an authentication tag computation for the entire message and split messages across a group of M engines. As seen, this can be extended to any number of engines. Assuming the split size is B 16 B blocks (AES-CTR uses 16 B as the block size) and the message has N splits, where the last split can have any number of bytes, the sequential tag equation T is expressed as follows:

$$T = D_1 * H^{(B*N)} \oplus D_2 * H^{B*(N-1)} \oplus \ldots \oplus D_N * H,$$

where H is a multiplier equal to the encrypted value of IV (e.g., 128'h0 using session keys). It should be noted that the multiply "*" and add "+" operations are performed over GF binary field.

In at least one embodiment, the equations for parallel tag calculations across M number of DMA engines are expressed as follows:

Each Split size=B blocks (block=16 B)
Number of DMA engines=m
Number of splits N=r*m
Authentication Tag $T = D_1 H^{N*B} \oplus D_2 \cdot H^{(N-1)*B} \oplus \ldots \oplus D_{N-1} \cdot H^{2*B} \oplus D_N \cdot H^{1*B}$ Engine 1 split assignment: $D_1, D_{m+1}, D_{2m+1}, D_{(r-1)m+1}$
Engine 1 authentication tag: $T_1$
$T_1 = ((D_1 \cdot H^2) * H^{(m-1)*B} \oplus (D_{M+1} \cdot H^B)) \cdot H^{(m-1)*B} \oplus \ldots$ (r rounds)
$T_1 = (D_1 \cdot H^{(r*m)*B}) \oplus (D_{m+1} \cdot H^{((r-1)*m)*B}) \oplus \ldots \oplus (D_{(r-1)m+1} \cdot H^{m*B}$
$T_1 = (D_1 \cdot H^{N*B}) \oplus (D_{m+1} \cdot H^{(N-m)*B}) \oplus \ldots \oplus (D_{(r-1)m+1} \cdot H^{m*B}$ Engine 2 split assignment: $D_2, D_{m+2}, D_{2m+2}, \ldots, D_{(r-1)m+2}$
Engine 2 authentication tag: $T_2$
$T_2 = ((D_2 \cdot H^B) * H^{(m-2)*B} \oplus (D_{M+2} \cdot H^B)) \cdot H^{(m-2)*B} \oplus \ldots$ (r rounds)
$T_2 = (D_2 \cdot H^{(r*(m-1))*B}) \oplus (D_{m+2} \cdot H^{((r-1)*(m-1))*B}) \oplus \ldots \oplus (D_{(r-1)m+2} \cdot H^{(m-1)*B}$
$T_2 = (D_2 \cdot H^{(N-r)*B}) \oplus (D_{m+2} \cdot H^{(N-r-(m-1))*B}) \oplus \ldots \oplus (D_{r-1)m+2} \cdot H^{(m-1)*B}$
. . .

Engine m split assignment: $D_m, D_{2m}, D_{3m}, \ldots, D_{r*m}$
Engine m authentication tag: $T_m$
$T_m = ((D_m \cdot H^B) \oplus (D_{2m} \cdot H^B)) \cdot H^{(m-1)*B} \oplus \ldots$ (r rounds)
$T_{Tm} = (D_m \cdot H^{r*B}) \oplus (D_{2m} \cdot H^{(r-1)*B}) \oplus \ldots \oplus (D_{r*m} \cdot H^B$ $$T_m = \left(D_m \cdot H^{\frac{N}{m}*B}\right) \bigoplus \left(D_{2m} \cdot H^{\left(\frac{N}{m}-1\right)*B}\right) \bigoplus \ldots \cdot \bigoplus (D_N \cdot H^B)$$

Combining $T_1, T_2, \ldots T_m$, we obtain same Authentication Tag as sequentially computed tag
$T = T_1 \oplus T_2 \oplus \ldots \oplus T_m$
$T = D_1 \cdot H^{N*B} \oplus D_2 \cdot H^{(N-1)*B} \oplus \ldots \oplus D_{N-1} \cdot H^{2*B} \oplus D_N \cdot H^{1*B}$ In at least one embodiment, within each DMA engine, depending on the datapath width, multiple AES cores can be used (datapath width in bytes/16 B). As described herein, each PCE 210 can include two AES cores, but does not need any additional AES cores for computing the authentication tag. As described herein with respect to FIG. 5, the 16 B within a copy split are interleaved across two AES cores. The multiplier exponent needed is derived from the number of parallel AES cores in each DMA engine.

In at least one embodiment, the DMA circuit 204 includes a GF multiplier 234. The DMA circuit 204 can calculate (and even pre-calculate in some instances) using the GF multiplier 234, multiplier exponents based on split sizes of the set of partial transfers. In at least one embodiment, the orchestration circuit 122 can cause the GF multiplier 234 to compute multiplier exponents for computing the authentication tag for the data transfer. In another embodiment, the LCE 208 can cause the GF multiplier 234 to compute the multiplier exponents.

In at least one embodiment, the LCE 208 is assigned an encryption key and a first IV for a first data transfer for a given context. The LCE 208 exchanges the encryption key and the first IV with the multiple PCEs 210 during a context bind process. In some cases, the keys do not change during a life of the context of a data transfer. The DMA circuit 204 calculates the multiplier exponents during latency of the context bind using the encryption key and the first IV with the PCEs 210. In another embodiment, the multiplier exponents can be computed when needed, such as when there is not enough storage to store pre-computed multiplier exponents. In at least one embodiment, the LCE 208 schedules the partial transfers on the available PCEs 210. In at least one embodiment, the LCE 208 can load balance the partial transfers across the available PCEs 210 using a round-robin scheduling scheme. In other embodiments, other scheduling schemes can be used. In at least one embodiment, each PCE includes a round key generator, two encrypt engines, and two GF multipliers. In some cases, the orchestration circuit 122 can reuse one of the GF multipliers for computing or pre-computing multiplier exponents as described herein. In other embodiments, a separate GF multiplier is used by the orchestration circuit 122. It should be noted that software can prefer that each context use a unique key. The unique key can be referred to as a session key by software. There are multiple contexts (sessions) supported. The session key remains unchanged throughout the context. The key is changed after the context is switched out. Every context also has an IV assigned. This IV is incremented (the block counter portion) for every encrypt message during the context. It should be noted that the block counter is incremented once for the entire message. If the message is split, which is done in the hardware, the block counter is not incremented for each split as described below.

In at least one embodiment, each of the PCEs 210 receives a value of a block counter of the LCE 208. The LCE 208 can increment the block counter for each of the set of partial transfers scheduled to one of the PCEs 210. Each of the PCEs 210 generates encrypted data for the respective partial transfer using at least the encryption key, the first IV for the data transfer, the value of the block counter. Each of the PCEs 210 calculates a partial authentication tag for a length of the respective partial transfer and stores the partial authentication tag in the buffer 232 of the orchestration circuit 122. As indicated in the equations above, an adjustment exponent is used for each of the DMA engines. The adjustment exponent is a multiplier exponent that is a function of a split size of a partial transfer and a number of the PCEs 210 being configured. In at least one embodiment, the orchestration circuit 122 calculates a first product of a first adjustment exponent and the first partial authentication tag and calculates a second product of a second adjustment exponent and the second partial authentication tag. The orchestration circuit 122 combines the first product and the second product to obtain a first result. The orchestration circuit 122 can combine other products corresponding to other PCEs 210, as needed. At the end of the transfer, the orchestration circuit 122 combines a length of the data transfer with at least the result to obtain a combined authentication tag. The orchestration circuit 122 encrypts the combined authentication tag using the first IV to generate the authentication tag for the first data transfer.

Figure 3A:
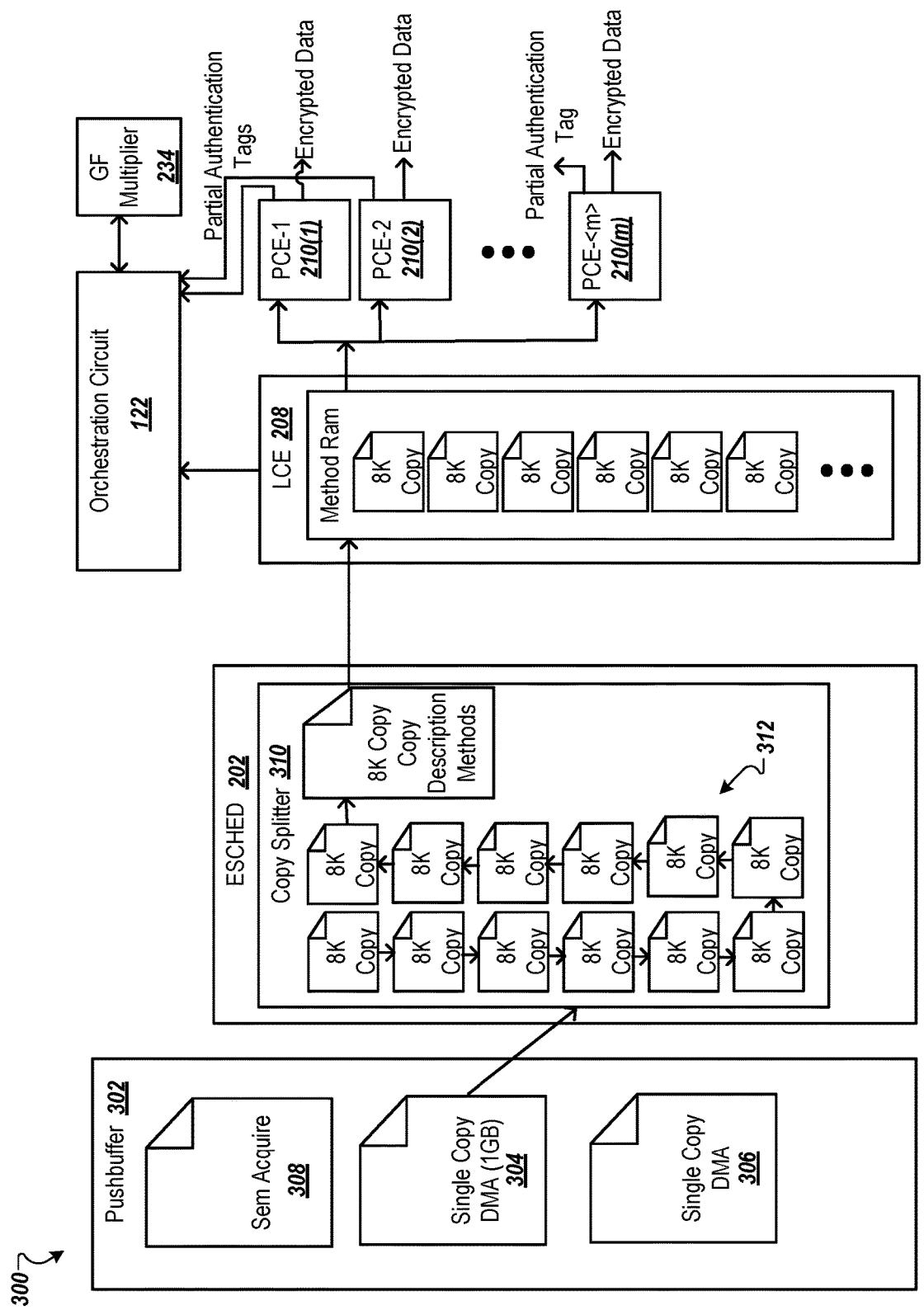
FIG. 3A is a functional diagram of a flow of scheduling a single data transfer to be performed by a DMA circuit, in accordance with at least some embodiments.

FIG. 3A is a functional diagram of a flow 300 of scheduling a single data transfer performed by a DMA circuit, in accordance with at least some embodiments. A pushbuffer 302, assigned to an application, is stored in secondary memory 206 (not illustrated in FIG. 3A). The pushbuffer 302 can include multiple data transfers 304, 306 (also called single copy DMA) and a semaphore acquire mechanism 308. A pushbuffer contains specifications of the operations that a GPU context is to perform for a particular client. The pushbuffers are stored in memory. The software can put the semaphore acquire mechanism 308 at the end of the pushbuffer 302 and have an engine release the semaphore. The pushbuffer 302 can also store an index assigned to where the IV, KEY, and partial authentication tags are stored in secure memory 212 during encryption or decryption.

During a timeslice for the application, the hardware scheduler circuit 202 (ESCHED) receives a first application descriptor for a first data transfer 304 from the pushbuffer 302. The hardware scheduler circuit 202 includes a copy splitter 310 that splits the first data transfer 304 (single copy DMA) into a set of partial transfers 312. Each partial transfer 312 has a fixed size (e.g., 8 KB) that should be less than or equal to the size of the first data transfer (e.g., 1 GB). Each partial transfer 312 has a requirement to be completed before a context switch to another application once started. Each partial transfer 312 (e.g., 8 KB copy) contains a binary descriptor represented by one or more methods. The LCE 208 receives the partial transfers 312 from the hardware scheduler circuit 202, and the LCE 208 schedules a subset of the partial transfers 312 to be executed on the PCE 210 during a timeslice. In some cases, the hardware scheduler circuit 202 only sends the subset of the partial transfers 312 to the LCE 208 to be executed during the timeslice. In at least one embodiment, the LCE 208 schedules a first partial transfer with a first PCE 210(1), a second partial transfer with a second PCE 210(2), and so forth until an mth PCE 210(m), where m represents the number of allocated PCEs for the data transfer. Each of the PCEs 210 executes the respective scheduled partial transfer to generate encrypted data and a partial authentication tag. The partial authentication tags are stored by the orchestration circuit 122. The orchestration circuit 122 computes the adjustment exponents using the GF multiplier 234. The orchestration circuit 122 computes an authentication tag using the partial authentication tags and the adjustment exponents described herein. It should be noted that FIG. 3A only shows the data transfers of a single application. The hardware scheduler circuit 202 can receive data transfers from other pushbuffers corresponding to other applications. It should also be noted that the LCE 208 is not necessarily shared between multiple users in separate timeslices. In some embodiments, the PCEs 210 are shared between multiple LCEs, such as illustrated and described with respect to FIG. 3B.

Figure 3B:
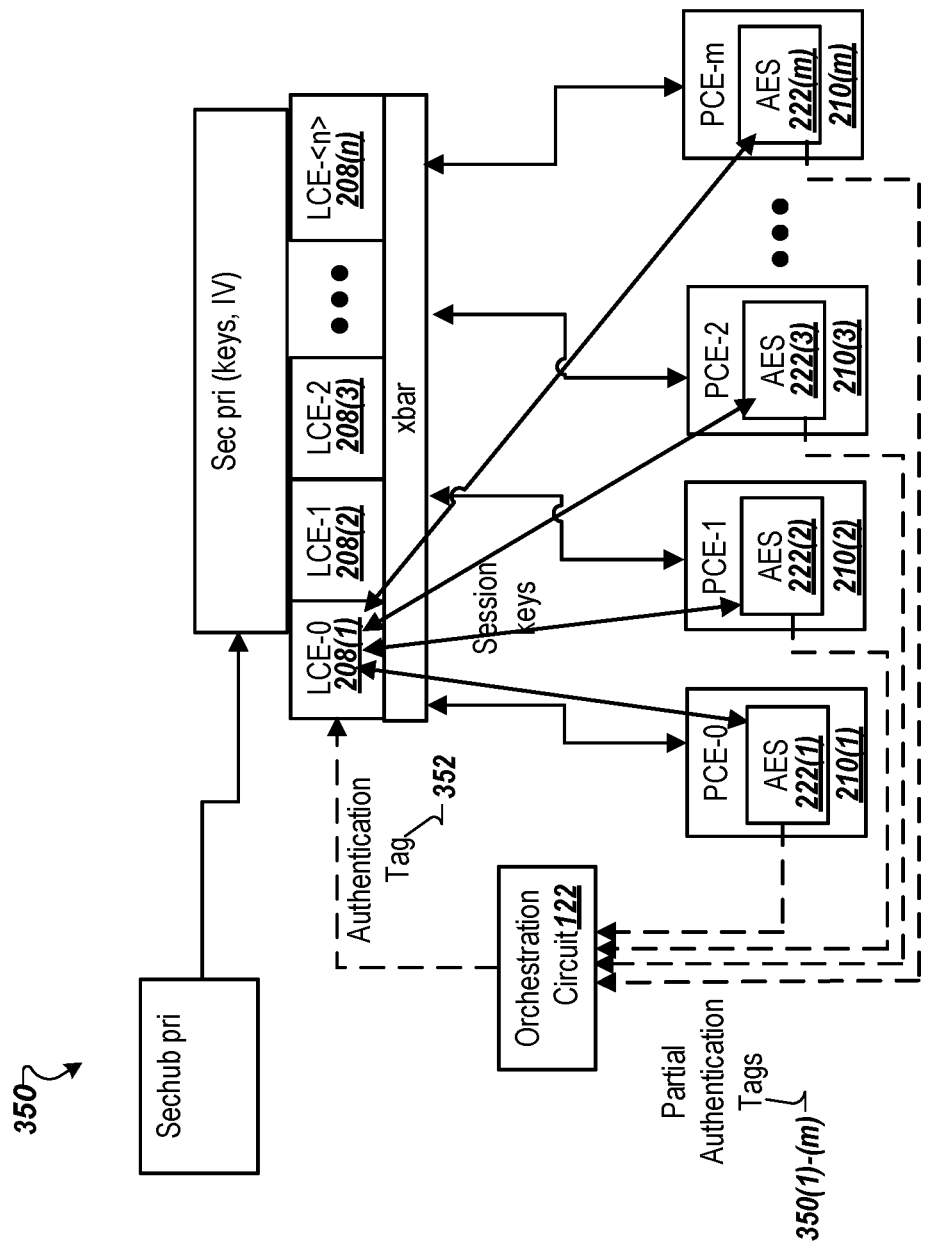
FIG. 3B is a functional diagram of a flow of one of multiple logical DMA engines scheduling partial transfers to multiple physical DMA engines, in accordance with at least some embodiments.

FIG. 3B is a functional diagram of a flow 350 of one of multiple logical DMA engines scheduling partial transfers to multiple physical DMA engines, in accordance with at least some embodiments. In this embodiment, the accelerator circuit includes n number of LCEs 208 (e.g., 8) and m number of PCEs 210 (e.g., 8). Each LCE 208 can be mapped to one or more PCEs 210. During operation, a first LCE 208(1) can be scheduled to perform a first data transfer using the m number of PCEs 210. The first LCE 208(1) is assigned an encryption key per context and a IV for each data transfer. The encryption key and first IV can be received over a secure private interface from the SECHUB. The first LCE 208(1) can context bind the first encryption key and the first IV with the cryptographic circuits 222(1)-(m) of the multiple PCEs 210(1)-(m). This can be done over a secure interface between the first LCE 208(1) and each of the cryptographic circuits 222(1)-(m). The first LCE 208(1) can communicate with each of the multiple PCEs 210(1)-(m) over a separate interface than the secure interface between the first LCE 208(1) and the cryptographic circuits 222(1)-(m). Each of the cryptographic circuits 222(1)-(m) has a secure interface to the orchestration circuit 122. Once a cryptographic circuit 222 computes a partial authentication tag, the cryptographic circuit 222 stores the partial authentication tag in the orchestration circuit 122, such as in a FIFO buffer associated with the respective cryptographic circuit 222. In at least one embodiment, the accelerator circuit can pre-calculate multiplier exponents during latency of the context bind of the first encryption key and the first IV with the multiple PCEs 210(1)-(m).

In at least one embodiment, the first LCE 208(1) uses a block counter to increment a value of the first IV for each partial transfer scheduled. For example, a first value of the first IV is provided to the first cryptographic circuit 222(1), and an incremented value of the first IV is provided to the second cryptographic circuit 222(2), and so on until the mth cryptographic circuit 222(m) in a first round. If more rounds are needed, an incremented value is provided to the first cryptographic circuit 222(1) and so on until no more rounds are needed. Each of the cryptographic circuits 222(1)-(m) generates encrypted data for the respective partial transfer using at least the first encryption key, the first IV, and the respective value of the block counter. Each of the cryptographic circuits 222(1)-(m) calculates a partial authentication tag 350(1)-(m) for a length of the respective partial transfer. The orchestration circuit 122 calculates an authentication tag 352 using the partial authentication tags 350(1)-(m). As described herein, the orchestration circuit 122 calculates a first product of a first adjustment exponent and a first partial authentication tag 350(1), a second product of a second adjustment exponent and a second partial authentication tag 350(2), and so on until an mth product of an mth adjustment exponent and an mth partial authentication tag 350(m). The orchestration circuit 122 combines the first product, the second product, and so on to the mth product to obtain a first result. This process can continue for one or more rounds. The orchestration circuit 122 combines a length of the first data transfer with at least the first result to obtain a combined authentication tag. The orchestration circuit 122 encrypts the combined authentication tag using the first IV to generate the authentication tag 352 for the first data transfer. The authentication tag 352 can be provided to the LCE 208(1).

At a subsequent time, a second LCE 208(2) can be scheduled to perform a second data transfer using m number of PCEs 210 (or less than m). The second LCE 208(2) can send, to the allocated PCEs 210, a second encryption key and a second IV assigned to a second data transfer. The PCEs 210 and the orchestration circuit 122 can operate in a similar manner above to compute a second authentication tag for the second data transfer and can provide the second authentication tag back to the second LCE 208(2). Similarly, other LCEs can be scheduled to perform operations using one or more of the multiple PCEs 210.

In at least one embodiment, preemption is supported by the accelerator circuit. A context can be preempted before the encrypt copy operation is complete. In this case, the copy state and the partial authentication tag(s) are saved in secure storage on preemption. This state is restored when the context is scheduled again.

Figure 4:
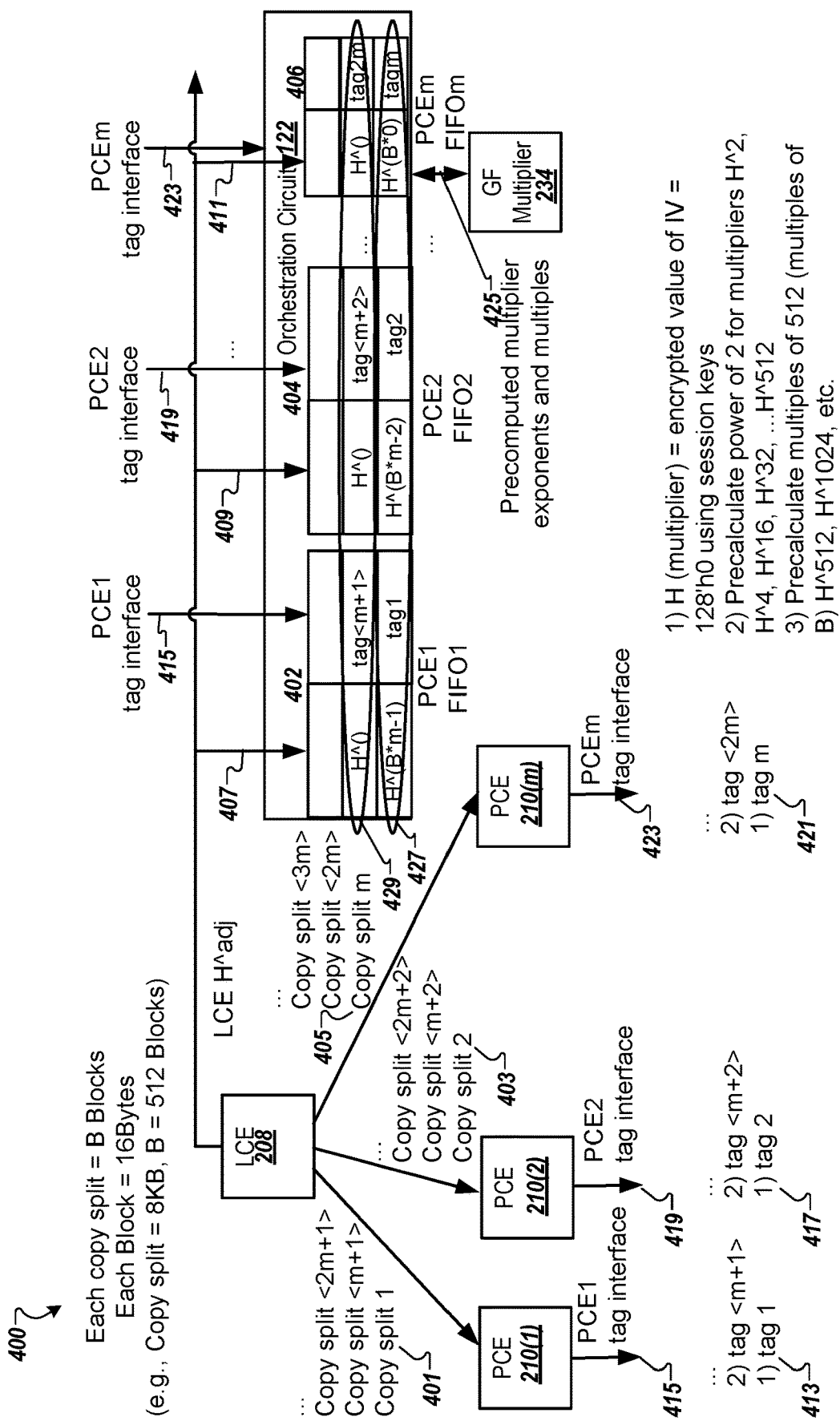
FIG. 4 illustrates a DMA circuit with a logical copy engine (CE), multiple physical copy engines (PCEs), and an orchestration circuit for computing an authentication tag for partial transfers scheduled across multiple PCEs, in accordance with at least some embodiments.

FIG. 4 illustrates a DMA circuit 400 with an LCE 208, multiple PCE 210, and an orchestration circuit 122 for computing an authentication tag for partial transfers scheduled across multiple PCEs, in accordance with at least some embodiments. The orchestration circuit 122 includes multiple FIFO buffers, including a first FIFO 402 associated with a first PCE 210(1), a second FIFO 404 associated with a second PCE 210(2), and an mth FIFO buffer 406 associated with an mth PCE 210(m). Each copy split is a B number of blocks, and each block is 16 bytes. For example, if there are 512 blocks, the copy split is about 8 KB in size. As described herein, a copy operation (e.g., a data transfer) can be split into multiple copy splits (partial transfers). During a first round, the LCE 208 can assign a first copy split 401 to a first PCE 210(1), a second copy split 403 to a second PCE 210(2), and an mth copy split 405 to an mth PCE 210(m). The LCE 208 can store a first adjustment exponent 407 in the first buffer 402, a second adjustment exponent 409 in the second FIFO buffer 404, and an mth adjustment exponent 411 in the mth FIFO buffer 406. The first PCE 210(1) computes a first tag 413 and stores the first tag 413 in the first FIFO buffer 402 over a first PCE tag interface 415 between the first PCE 210(1) and the orchestration circuit 122. The second PCE 210(2) computes a second tag 417 and stores the second tag 417 in the second FIFO buffer 404 over a second PCE tag interface 419 between the second PCE 210(2) and the orchestration circuit 122. The mth PCE 210(m) computes an mth tag 421 and stores the mth tag 421 in the mth FIFO buffer 406 over an mth PCE tag interface 423 between the mth PCE 210(m) and the orchestration circuit 122. The orchestration circuit 122 can request that the GF multiplier 234 computes or pre-computes multiplier exponents 425 needed for computing an authentication tag. The orchestration circuit 122 can request that the GF multiplier 234 compute or pre-compute multiples of B (e.g., 512) needed for computing a first-round authentication tag 427. For example, H represents a multiplier exponent. The 128-bit value for h0 is the encrypted value of the IV. The GF multiplier 234 can calculate or pre-calculate the power of 2 for multipliers H^2, H^4, H^B (e.g., 512). The GF multiplier 234 can calculate or pre-calculate multiples of B (e.g., H^512, H^1024, . . . ). After the first round, the orchestration circuit 122 can compute the first-round authentication tag 427.

During a second round, the LCE 208 can assign an m+1 copy split to the first PCE 210(1), an m+2 copy split to the second PCE 210(2), and a 2 m copy split 405 to the mth PCE 210(m). The LCE 208 can store the respective adjustment exponents in the FIFO buffers. The first PCE 210(1) computes an m+1 tag and stores the m+1 tag in the first FIFO buffer 402. The second PCE 210(2) computes an m+2 tag and stores the m+2 tag in the second FIFO buffer 404. The mth PCE 210(m) computes a 2 m tag and stores the 2 m tag in the mth FIFO buffer 406. The orchestration circuit 122 can request that the GF multiplier 234 compute or pre-compute multiplier exponents 425 needed for computing an authentication tag. The orchestration circuit 122 can request that the GF multiplier 234 compute or pre-compute multiples of B (e.g., 512) needed for computing a second-round authentication tag 429. After the second round, the orchestration circuit 122 can compute the second-round authentication tag 429. The process can repeat until all copy splits are scheduled, and tags are computed for each of the copy splits over one or more rounds as described above. At a last round, the orchestration circuit 122 can compute an authentication tag for the copy operation.

As described above, each of the PCEs 210 (or physical DMA engines) can include one or more cryptographic hardware engines (e.g., two AES-GCM cores). For example, each PCE can have a datapath of 32 bytes per clock cycle and includes two 16-byte AES-GCM cores. In addition to computing the authentication tag for partial transfers scheduled across multiple PCEs, the PCEs can include hardware entities that manage interleaving data across parallel AES-GCM cores inside a single PCE, such as illustrated in FIG. 5.

Figure 5:
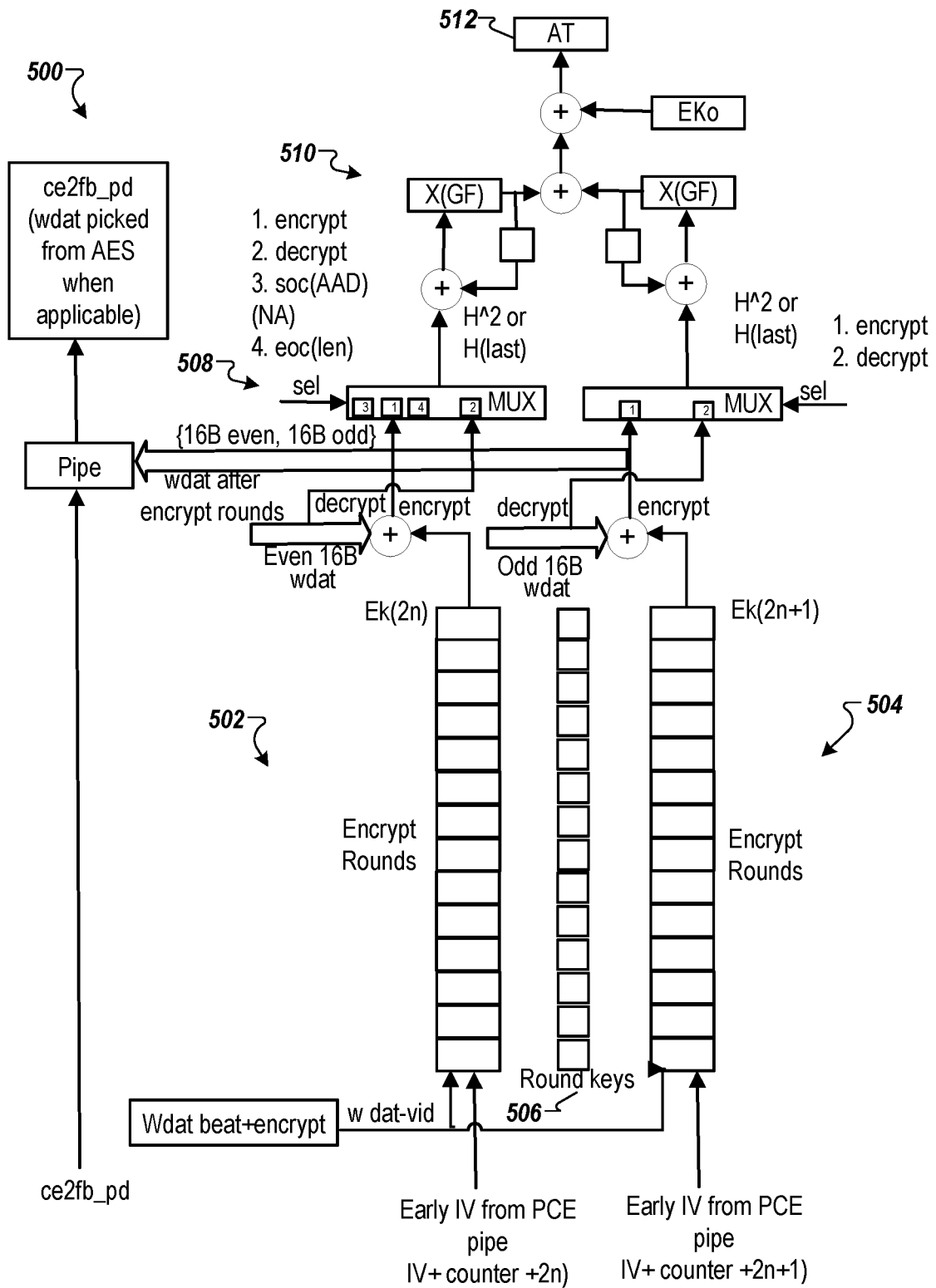
FIG. 5 is a block diagram of a DMA hardware engine that combines partial authentication tags from two cryptographic hardware engines, in accordance with at least some embodiments.

FIG. 5 is a block diagram of a DMA hardware engine 500 that combines partial authentication tags from two cryptographic hardware engines 502, 504 (e.g., AES-GCM hardware engines), in accordance with at least some embodiments. The DMA hardware engine 500 includes a first cryptographic hardware engine 502 that is in close proximity to a second cryptographic hardware engine 504. The first cryptographic hardware engine 502 receives a first IV and a first value of a block counter (e.g., IV+(counter+2n)). The second cryptographic hardware engine 504 receives the first IV and a second value of the block counter (e.g., IV+(counter+2n+1). Using round keys 506, the first cryptographic hardware engine 502 generates encrypted data over multiple encrypt rounds. The DMA hardware engine 500 includes multiplexers 508 and other circuitry 510 used to combine data from the two cryptographic hardware engines to calculate a coherent partial authentication tag 512 for the partial transfer scheduled to the DMA hardware engine 500. In this embodiment, two cryptographic hardware engines collectively compute a partial authentication tag across the two cryptographic hardware engines for a length of a partial transfer assigned to the DMA hardware engine 500.

Figure 6:
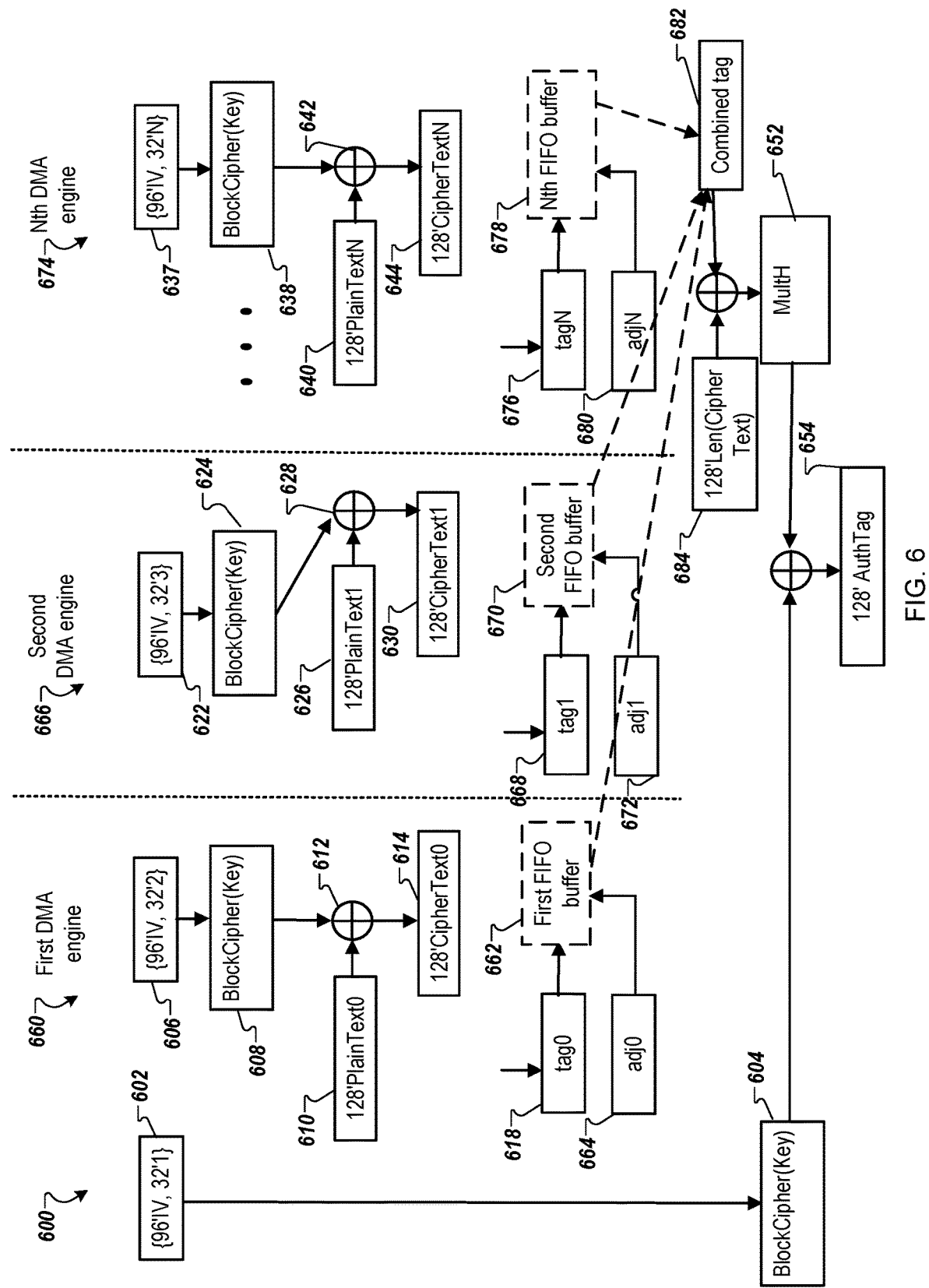
FIG. 6 is a flow diagram of an encryption operation used for multiple partial transfers scheduled across multiple DMA engines, in accordance with at least some embodiments.

FIG. 6 is a flow diagram of an encryption operation 600 used for multiple partial transfers scheduled across multiple DMA engines, in accordance with at least some embodiments. The encryption operation 600 is a simplified AES-GCM operation that shows individual partial transfers on separate DMA engines. For AES-GCM, blocks are numbered sequentially using a block counter (32'1). The value of the block counter is combined with a first IV (96'IV) (block 602) and encrypted with an AES block cipher to obtain a first result (block 604). In particular, the first IV and a first value of the first block counter are encrypted with a first block cipher using the first encryption key to obtain the first result. The block counter is incremented (32'2) with the IV (96'IV) (block 606) and encrypted with an AES block cipher to obtain a second result (block 608). In particular, the first IV and a second value of the first block counter are encrypted with a second block cipher using the first encryption key to obtain a second result. The second result and first plaintext 610 are combined (e.g., XOR'd) (block 612) to obtain first cipher text 614. This can be done on a first DMA engine 660. The first DMA engine 660 can compute a first partial tag 618 and store the first partial tag 618 in a first FIFO buffer 662. A first adjustment 664 can also be stored in the first FIFO buffer 662.

The block counter is incremented (32'3) with the IV (96'IV) (block 622) and encrypted with an AES block cipher to obtain a third result (block 624). In particular, the first IV and a third value of the first block counter are encrypted with a second block cipher using the first encryption key to obtain a third result. The third result and second plaintext 626 are combined (e.g., XOR'd) (block 628) to obtain second cipher text 630. This can be done on a second DMA engine 666. The second DMA engine 666 can compute a second partial tag 668 and store the second partial tag 668 in a second FIFO buffer 670. A second adjustment 672 can also be stored in the second FIFO buffer 670.

At the end of the data transfer, the block counter is incremented (32'N) with the IV (96'IV) (block 637) and encrypted with an AES block cipher to obtain a fourth result (block 638). In particular, the first IV and an nth value of the first block counter are encrypted with an Nth block cipher using the first encryption key to obtain the fourth result. The fourth result and Nth plaintext 640 are combined (e.g., XOR'd) (block 642) to obtain Nth cipher text 644. This can be done on an Nth DMA engine 674. The Nth DMA engine 674 can compute an Nth partial tag 676 and store the Nth partial tag 676 in an Nth FIFO buffer 678. An Nth adjustment 680 can also be stored in the Nth FIFO buffer 678. The partial tags can be multiplied by their respective adjustments to derive a combined tag 682. The combined tag 682 can be combined with a length of the cipher text 684 to derive an unencrypted tag 652. The unencrypted tag 652 can be combined with the first result from block 604 to generate an authentication tag 654 for the data transfer.

Figure 7:
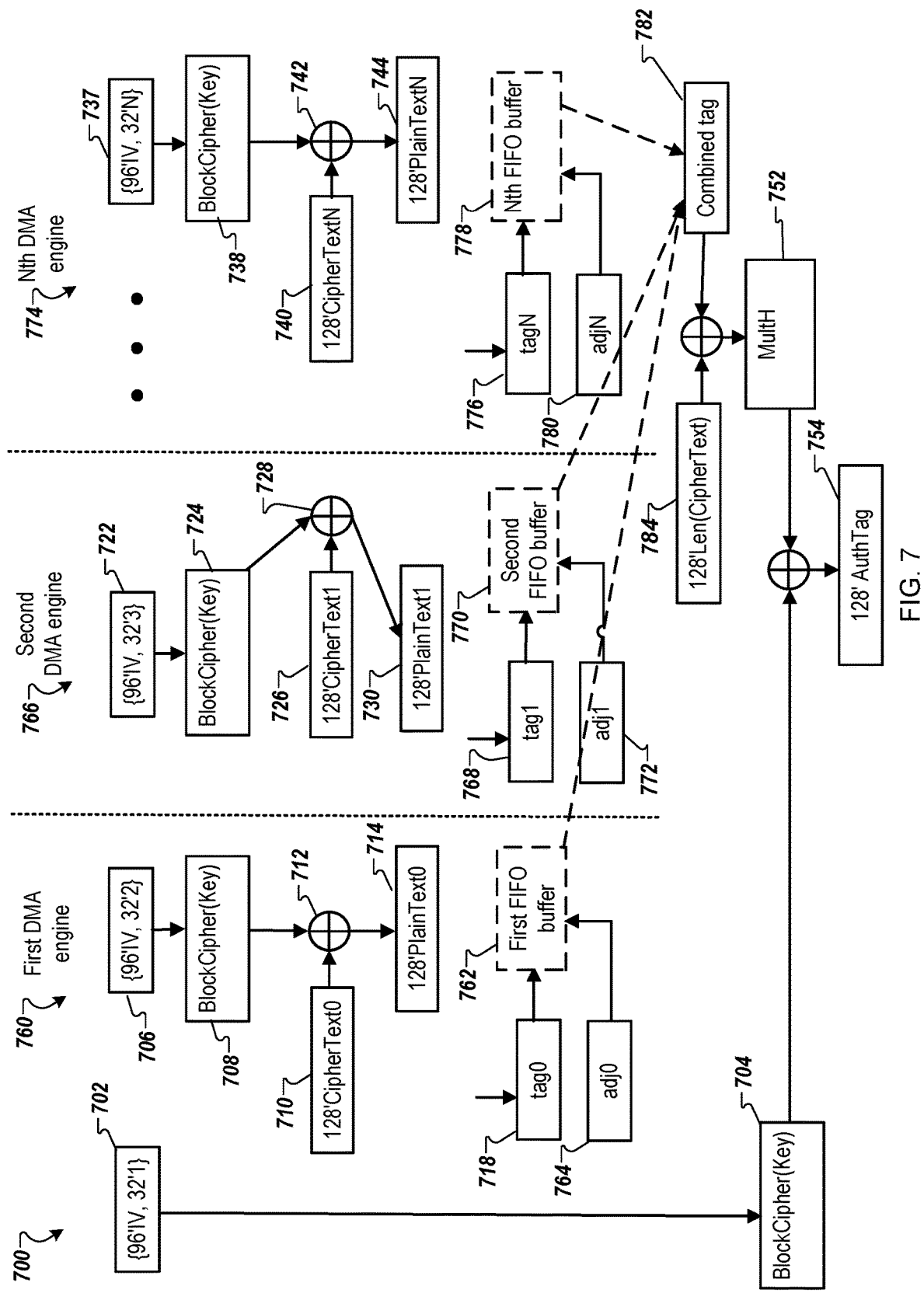
FIG. 7 is a flow diagram of a decryption operation used for multiple partial transfers scheduled across multiple DMA engines, in accordance with at least some embodiments.

FIG. 7 is a flow diagram of a decryption operation 700 used for a partial transfer, in accordance with at least some embodiments. The decryption operation 700 is a simplified AES-GCM operation that shows a context switch before completing the full data transfer. For AES-GCM, blocks are numbered sequentially using a block counter (32'1). The value of the block counter is combined with a first IV (96'IV) (block 702) and encrypted with an AES block cipher to obtain a first result (block 704). In particular, the first IV and a first value of the first block counter are encrypted with a first block cipher using the first encryption key to obtain the first result. The block counter is incremented (32'2) with the W (96'IV) (block 706) and encrypted with an AES block cipher to obtain a second result (block 708). In particular, the first IV and a second value of the first block counter are encrypted with a second block cipher using the first encryption key to obtain a second result. The second result and first cipher text 710 are combined (e.g., XOR'd) (block 612) to obtain first plaintext 714. This can be done on a first DMA engine 760. The first DMA engine 760 can compute a first partial tag 718 and store the first partial tag 718 in a first FIFO buffer 762. A first adjustment 764 can also be stored in the first FIFO buffer 762.

The block counter is incremented (32'3) with the IV (96'IV) (block 722) and encrypted with an AES block cipher to obtain a third result (block 724). In particular, the first IV and a third value of the first block counter are encrypted with a second block cipher using the first encryption key to obtain a third result. The third result and second cipher text 726 are combined (e.g., XOR'd) (block 728) to obtain second plaintext 730. This can be done on a second DMA engine 766. The second DMA engine 766 can compute a second partial tag 768 and store the second partial tag 768 in a second FIFO buffer 770. A second adjustment 772 can also be stored in the second FIFO buffer 770.

At the end of the data transfer, the block counter is incremented (32'N) with the IV (96'IV) (block 737) and encrypted with an AES block cipher to obtain a fourth result (block 738). In particular, the first IV and an nth value of the first block counter are encrypted with an Nth block cipher using the first encryption key to obtain the fourth result. The fourth result and Nth cipher text 740 are combined (e.g., XOR'd) (block 742) to obtain Nth plaintext 744. This can be done on an Nth DMA engine 774. The Nth DMA engine 774 can compute an Nth partial tag 776 and store the Nth partial tag 776 in an Nth FIFO buffer 778. An Nth adjustment 780 can also be stored in the Nth FIFO buffer 778. The partial tags can be multiplied by their respective adjustments to derive a combined tag 782. The combined tag 782 can be combined with a length of the cipher text 784 to derive an unencrypted tag 752. The unencrypted tag 752 can be combined with the first result from block 704 to generate an authentication tag 754 for the data transfer.

Figure 8:
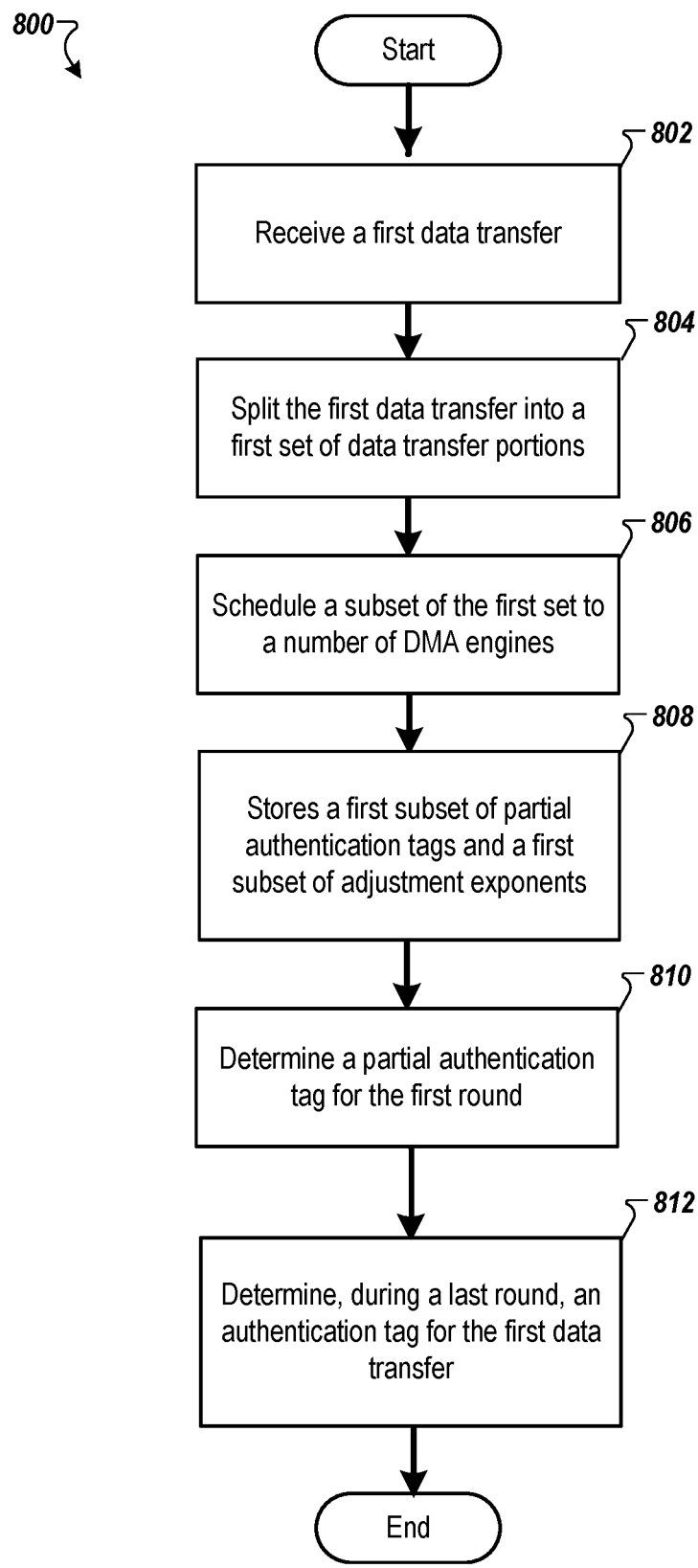
FIG. 8 is a flow diagram of a method of computing an authentication tag from multiple partial transfers scheduled across multiple DMA engines, in accordance with at least some embodiments.

FIG. 8 is a flow diagram of a method 800 of computing an authentication tag from multiple partial transfers schedule across multiple DMA engines, in accordance with at least some embodiments. Method 800 can be performed by processing logic comprising hardware, software, firmware, or any combination thereof. In at least one embodiment, the method 800 is performed by the accelerator circuit 102 of FIG. 1. In at least one embodiment, the method 800 is performed by the copy engine 120 of FIG. 1. In at least one embodiment, the method 800 is performed by hardware scheduler circuit 202 of FIG. 2. In at least one embodiment, the method 800 is performed by hardware scheduler circuit 202 and the DMA circuit 204 of FIG. 2.

Referring to FIG. 8, the method 800 begins by processing logic receiving a first data transfer of a first size (block 802). The processing logic splits the first data transfer into a first set of portions, each portion being less than the first size (block 804). During a first round, the processing logic schedules a subset of the first set of portions to a number of DMA engines, each comprising a cryptographic hardware engine (block 806). The processing logic stores a first subset of partial authentication tags, computed by the DMA engines, and a first subset of corresponding adjustment exponents (block 808). The processing logic determines a partial authentication tag for the first round (block 810). In at least one embodiment, the processing logic determines the partial authentication tag by multiplying each partial authentication tag by its corresponding adjustment exponent to obtain a result and combining each result to obtain the partial authentication tag for the first round. The process can process zero or more additional rounds. During a last round, the processing logic determines an authentication tag for the first data transfer (block 812), and the method 800 ends. In at least one embodiment, the processing logic determines the authentication tag for the first data transfer by combining the partial authentication tag from each round to obtain a combined authentication tag and combining a length of the first data transfer with the combined authentication tag. In at least one embodiment, the processing logic encrypts the authentication tag using a first encrypted IV assigned to the first data transfer.

In a further embodiment, the processing logic, during the first round, generates encrypted data for a first partial transfer by a first DMA engine of the number of DMA engines. The processing logic calculates a first partial authentication tag for a length of the first partial transfer by the first DMA engine. The processing logic stores a first partial authentication tag and a first adjustment exponent in a first buffer (e.g., first FIFO buffer) associated with the first DMA engine. The processing logic generates encrypted data for a second partial transfer by a second DMA engine of the number of DMA engines. The processing logic calculates a second partial authentication tag for a length of the second partial transfer by the second DMA engine. The processing logic stores a second partial authentication tag and a second adjustment exponent in a second buffer (e.g., second FIFO buffer) associated with the first DMA engine. The processing logic can calculate partial authentication tags using other DMA engines during the first round and store the partial authentication tags and adjustment exponents in respective buffers.

In at least one embodiment, during a second round, the processing logic generates encrypted data for a third partial transfer by the first DMA engine and calculates a third partial authentication tag for a length of the third partial transfer by the first DMA engine. The processing logic stores the third partial authentication tag and a third adjustment exponent in the first buffer. The processing logic generates encrypted data for a fourth partial transfer by the second DMA engine and calculates a fourth partial authentication tag for a length of the fourth partial transfer by the second DMA engine. The processing logic stores the fourth partial authentication tag and a fourth adjustment exponent in the second buffer.

In at least one embodiment, during the first round, the processing logic calculates using a GF multiplier, a number of multiplier exponents based on at least split sizes of the set of partial transfers and the number of DMA engines.

In at least one embodiment, the processing logic performs a context bind process to deliver a first encryption key and a first IV to the number of DMA engines. In at least one embodiment, the processing logic calculates the number of multiplier exponents during the context bind process.

In a further embodiment, the processing logic determines the authentication tag for the first data transfer by encrypting the combined authentication tag using a first W associated with the first data transfer to obtain the authentication tag for the first data transfer.

Figure 9:
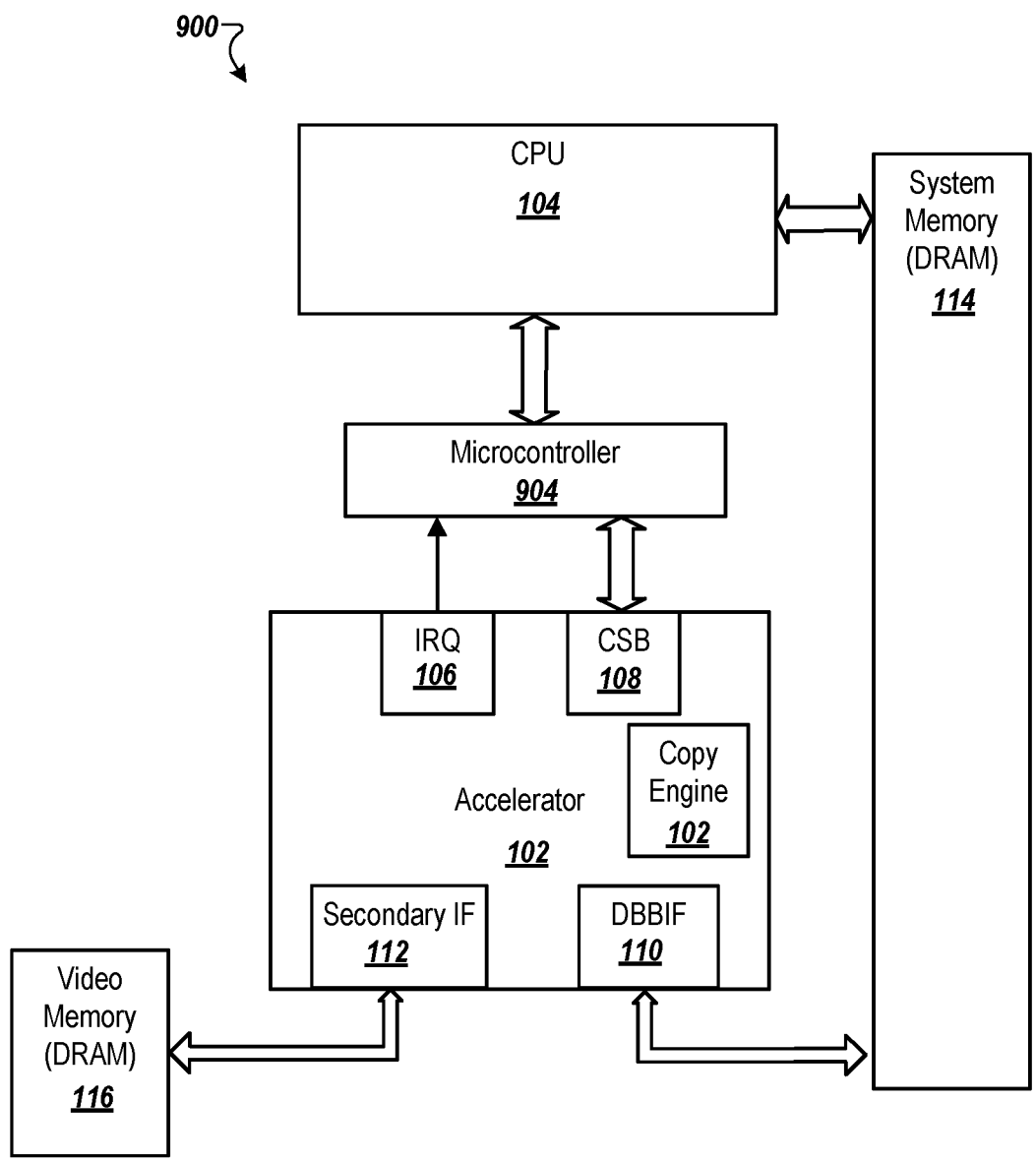
FIG. 9 is a block diagram of a computing system with an accelerator including a copy engine that computes an authentication tag for partial transfers scheduled across multiple DMA engines, in accordance with at least some embodiments.

FIG. 9 is a block diagram of a computing system 900 with an accelerator including a copy engine that computes an authentication tag for partial transfers scheduled across multiple DMA engines, in accordance with at least some embodiments. The computing system 900 is considered a headed system in which a main system processor, CPU 104 delegates high-interrupt-frequency tasks to a companion microcontroller 904 coupled to the accelerator circuit 102. The computing system 900 is similar to computing system 100 as noted by similar reference numbers, except the computing system 900 includes the companion microcontroller 904. The computing system 900 can be considered a larger system that is characterized by the addition of a dedicated control coprocessor and can include high-bandwidth SRAM to support the accelerator circuit 102.

In some cases, the larger model in FIG. 9 is used when higher performance and versatility are needed. Performance-oriented systems may perform inference on many different network topologies; thus, they maintain a high degree of flexibility. Additionally, these systems may perform many tasks simultaneously, rather than serializing inference operations, so inference operations would not consume too much processing power on the CPU 104. The accelerator circuit 102 can include a memory interface that couples to a dedicated high-bandwidth SRAM to address these needs. The SRAM can be used as a cache by the accelerator circuit 102. The SRAM can also be used by other high-performance computer-vision-related components on the system to further reduce traffic to the main system memory 114 (e.g., DRAM). The accelerator circuit 102 enables the interface with the microcontroller 904 (or a dedicated control coprocessor) to limit the interrupt load on the CPU 104. In at least one embodiment, the microcontroller 904 can be a RISC-V-based PicoRV32 processor, an ARM Cortex-M or Cortex-R processors, or other microcontroller designs. Using a dedicated coprocessor (microcontroller 904), the host processor (CPU 104) can handle some tasks associated with managing the accelerator circuit 102. For example, although the hardware scheduler circuit is responsible for scheduling and fine-grained programming of the accelerator circuit 102, the microcontroller 904 or CPU 104 can still handle some coarse-grained scheduling of the accelerator circuit 102, input-output memory management (IOMMU) mappings of memory access, as needed, memory allocation of input data and fixed weight arrays on accelerator circuit 102, and synchronization between other system components and tasks that run on the accelerator circuit 102.

The techniques disclosed herein may be incorporated in any processor that may be used for processing a neural network, such as, for example, a central processing unit (CPU), a GPU, a deep learning accelerator (DLA) circuit, an intelligence processing unit (IPU), neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA GeForce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range unless otherwise indicated herein. Each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when indicated explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium stores instructions and a main central processing unit ("CPU") executes some of the instructions while a graphics processing unit ("GPU") and/or a data processing unit ("DPU")—potentially in conjunction with a GPU—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An accelerator circuit comprising:
a secure memory;
a scheduler circuit to receive a first data transfer of a first size and split the first data transfer into a set of partial transfers; and
a direct memory access (DMA) circuit comprising a logical DMA engine, an orchestration circuit, and a plurality of DMA engines, each DMA engine of the plurality of DMA engines comprising a cryptographic circuit that implements an authenticated encryption algorithm to encrypt retrieved data from the secure memory or decrypt received data to be stored in the secure memory, wherein:
the logical DMA engine is to schedule a first partial transfer to a first DMA engine of the plurality of DMA engines and store a first adjustment exponent in a first buffer in the orchestration circuit, the first buffer associated with the first DMA engine;

the first DMA engine is to calculate a first partial authentication tag for the first partial transfer and store the first partial authentication tag in the first buffer;

the logical DMA engine is to schedule a second partial transfer to a second DMA engine of the plurality of DMA engines and store a second adjustment exponent in a second buffer in the orchestration circuit, the second buffer associated with the second DMA engine;

the second DMA engine is to calculate a second partial authentication tag for the second partial transfer and store the second partial authentication tag in the second buffer; and the orchestration circuit is to calculate a first combined authentication tag for the first data transfer based on at least the first adjustment exponent, the first partial authentication tag, the second adjustment exponent, and the second partial authentication tag.

2. The accelerator circuit of claim 1, wherein the DMA circuit further comprises a Galois Field (GF) multiplier, wherein the DMA circuit is to calculate, using the GF multiplier, a plurality of multiplier exponents based on at least split sizes of the set of partial transfers and a number of the plurality of DMA engines.

3. The accelerator circuit of claim 2, wherein the logical DMA engine is assigned a first encryption key and a first initialization vector (IV) for the first data transfer, wherein the logical DMA engine is to context bind the first encryption key and the first IV with the plurality of DMA engines.

4. The accelerator circuit of claim 3, wherein the DMA circuit is to calculate the plurality of multiplier exponents during latency of the context bind of the first encryption key and the first IV with the plurality of DMA engines.

5. The accelerator circuit of claim 3, wherein each of the plurality of DMA engines is to receive a value of a block counter of the logical DMA engine, wherein the block counter is incremented for each of the set of partial transfers scheduled to one of the plurality of DMA engines, wherein each of the plurality of DMA engines is to generate encrypted data for the respective partial transfer using at least the first encryption key, the first IV, the value of the block counter and to calculate a partial authentication tag for a length of the respective partial transfer.

6. The accelerator circuit of claim 1, wherein the orchestration circuit is to:
calculate a first product of the first adjustment exponent and the first partial authentication tag;
calculate a second product of the second adjustment exponent and the second partial authentication tag;
combine the first product and the second product to obtain a first result;
combine a length of the first data transfer with at least the first result to obtain a combined authentication tag; and
encrypt the combined authentication tag using a first initialization vector (IV) to generate the first combined authentication tag for the first data transfer.

7. The accelerator circuit of claim 1, wherein the first buffer is a first first-in, first-out (FIFO) buffer and the second buffer is a second FIFO buffer.

8. The accelerator circuit of claim 1, wherein the first adjustment exponent is a multiplier exponent that is a function of a split size of a partial transfer and a number of the plurality of DMA engines.

9. The accelerator circuit of claim 1, wherein the logical DMA engine is to schedule the set of partial transfers to the plurality of DMA engines using a round-robin arbitration scheme.

10. The accelerator circuit of claim 1, wherein the authenticated encryption algorithm is Advanced Encryption Standard Galois Counter Mode (AES-GCM).

11. The accelerator circuit of claim 1, wherein the accelerator circuit is a graphics processing unit (GPU), a deep learning accelerator (DLA) circuit, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), or a field-programmable gate array (FPGA).

12. A method of operating an accelerator circuit, the method comprising:
receiving a first data transfer of a first size;
splitting the first data transfer into a first set of data transfer portions, each data transfer portion being less than the first size;
during a first round,
scheduling a subset of the first set of data transfer portions to a plurality of direct memory access (DMA) engines, each comprising a cryptographic hardware engine,
storing a first subset of partial authentication tags, computed by the plurality of DMA engines, and a first subset of corresponding adjustment exponents, and
determining a partial authentication tag for the first round based on the first subset of partial authentication tags and corresponding adjustment exponents; and
during a last round, determining an authentication tag for the first data transfer by combining the partial authentication tag from each round to obtain a combined authentication tag and combining a length of the first data transfer with the combined authentication tag.

13. The method of claim 12, further comprising, during the first round:
generating encrypted data for a first partial transfer by a first DMA engine of the plurality of DMA engines;
calculating a first partial authentication tag for a length of the first partial transfer by the first DMA engine;
storing a first partial authentication tag and a first adjustment exponent in a first buffer associated with the first DMA engine;
generating encrypted data for a second partial transfer by a second DMA engine of the plurality of DMA engines;
calculating a second partial authentication tag for a length of the second partial transfer by the second DMA engine; and
storing a second partial authentication tag and a second adjustment exponent in a second buffer associated with the second DMA engine.

14. The method of claim 13, further comprising, during a second round:
generating encrypted data for a third partial transfer by the first DMA engine;
calculating a third partial authentication tag for a length of the third partial transfer by the first DMA engine;
storing a third partial authentication tag and a third adjustment exponent in the first buffer;
generating encrypted data for a fourth partial transfer by the second DMA engine;

calculating a fourth partial authentication tag for a length of the fourth partial transfer by the second DMA engine; and storing the fourth partial authentication tag and a fourth adjustment exponent in the second buffer.

15. The method of claim 13, further comprising, during the first round, calculating, using a Galois Field (GF) multiplier, a plurality of multiplier exponents based on at least split sizes of the set of partial transfers and a number of the plurality of DMA engines.

16. The method of claim 15, further comprising performing a context bind process to deliver a first encryption key and a first initialization vector (IV) to the plurality of DMA engines, wherein the calculating the plurality of multiplier exponents is done during the context bind process.

17. The method of claim 15, wherein determining the authentication tag further comprises encrypting the combined authentication tag using a first initialization vector (IV) associated with the first data transfer to obtain the authentication tag for the first data transfer.

18. An accelerator circuit comprising:
a copy engine (CE) comprising a plurality of Advanced Encryption Standard Galois Counter Mode (AES-GCM) hardware engines each configured to perform encryption and authentication, wherein the CE comprises secure memory to store a context comprising an encryption key, an initialization vector (IV), and a block counter; and
an engine scheduler coupled to the CE, wherein:
the engine scheduler is to:
receive an encryption or decryption operation descriptor of a data transfer of a specified size for an application; and
split the data transfer into a set of partial transfers, each partial transfer having a fixed size less than the specified size;

the copy engine (CE), during a first round, is to:
schedule a subset of the set of partial transfers to the plurality of AES-GCM hardware engines;
store a first subset of partial authentication tags, computed by the plurality of AES-GCM hardware engines, and a first subset of corresponding adjustment exponents, and
determine a partial authentication tag for the first round based on the first subset of partial authentication tags and the first subset of corresponding adjustment components; and
the copy engine (CE), during a last round, is to:
determine an authentication tag for the data transfer by combining the partial authentication tag from each round to obtain a combined authentication tag, combining a length of the data transfer with the combined authentication tag, and encrypting the combined authentication tag with the IV.

19. The accelerator circuit of claim 18 wherein the accelerator circuit is a graphics processing unit (GPU), a deep learning accelerator (DLA) circuit, an intelligence processing unit (IPU), a neural processing unit (NPU), a tensor processing unit (TPU), a neural network processor (NNP), a data processing unit (DPU), a vision processing unit (VPU), an application-specific integrated circuit (ASIC), or a field-programmable gate array (FPGA).

20. The accelerator circuit of claim 18 wherein the CE comprises:
a logical compute engine (LCE);
a plurality of physical compute engines (PCEs) coupled to the LCE, wherein each of the plurality of PCEs comprises one of the plurality of AES-GCM hardware engines; and
an orchestration circuit coupled to the LCE and the plurality of PCEs, wherein the orchestration circuit comprises a first-in, first-out (FIFO) buffer for each of the plurality of PCEs to store partial authentication tags and corresponding adjustment exponents.

* * * * *